United States Patent [19]

Howard, Jr. et al.

[11] Patent Number: 5,362,009
[45] Date of Patent: Nov. 8, 1994

[54] DRIVE BELT CORNER GUIDE ROLLER WITH STRUCTURED INNER SURFACE FOR A DATA CARTRIDGE

[75] Inventors: William L. Howard, Jr., Hennepin, Minn.; David P. Smith, St. Croix, Wis.

[73] Assignee: Minnesota Mining and Manufacturing Company, St. Paul, Minn.

[21] Appl. No.: 138,373

[22] Filed: Oct. 15, 1993

Related U.S. Application Data

[63] Continuation of Ser. No. 765,954, Sep. 26, 1991, abandoned, which is a continuation-in-part of Ser. No. 488,243, Mar. 5, 1990, abandoned.

[51] Int. Cl.$^5$ .............................................. G11B 23/087
[52] U.S. Cl. .................................... 242/342; 242/346.2
[58] Field of Search ................ 242/192, 76; 226/190, 226/193, 195; 384/282, 322, 416, 417, 418, 625

[56] References Cited

U.S. PATENT DOCUMENTS

| | | | |
|---|---|---|---|
| 3,620,473 | 11/1971 | Stone | 242/192 |
| 3,692,255 | 9/1972 | Von Behren | 242/192 |
| 4,102,516 | 7/1978 | Anglin et al. | 242/199 |
| 4,162,774 | 7/1979 | Bowers | 242/192 |
| 4,365,769 | 12/1982 | Shoji | 242/76 X |
| 4,429,823 | 2/1984 | Umehara | 242/76 X |
| 4,466,582 | 8/1984 | Shiba | 242/76 X |
| 4,474,342 | 10/1984 | Nater | 252/192 |
| 4,518,134 | 5/1985 | Oishi et al. | 242/76 X |
| 4,607,808 | 8/1986 | Collins | 242/192 |
| 4,863,116 | 9/1989 | Iizuka et al. | 242/76 X |

FOREIGN PATENT DOCUMENTS 63-114471  7/1988  Japan.

*Primary Examiner*—Daniel P. Stodola
*Assistant Examiner*—John P. Darling
*Attorney, Agent, or Firm*—Gary L. Griswold; Walter N. Kirn; Charles D. Levine

[57] ABSTRACT

A corner belt guide roller for use in a belt driven tape cartridge is disclosed. The roller controls drag on the driving belt to maintain magnetic tape tension and reduce variability in the cartridge operation. The guide roller is mounted on a pivot pin through an inner cylindrical surface. The inner cylindrical surface has an oriented controlled texture including axial splines. This enables the guide roller to have controlled friction with its pivot pin, and provide a predetermined constant amount of drag to the driving belt to improve the consistency of the tape cartridge operation.

14 Claims, 10 Drawing Sheets

DRIVE BELT CORNER GUIDE ROLLER WITH STRUCTURED INNER SURFACE FOR A DATA CARTRIDGE

This is a continuation of application Ser. No. 07/765,954 filed Sep. 26, 1991, now abandoned, which is a continuation-in-part of application Ser. No. 07/488,243, filed Mar. 5, 1990, now abandoned.

TECHNICAL FIELD

The present invention relates to guide rollers for guiding the drive belt of a reel-to-reel data tape cartridge. More particularly, the present invention relates to drive belt guide rollers which have textured inner surfaces to control friction and vibration between each roller and its pivot pin.

BACKGROUND OF THE INVENTION

The belt driven data tape cartridge of Von Behren, U.S. Pat. No. 3,692,255 has become a standard interface with computers where rapid acceleration and deceleration of the tape are required. In these reel-to-reel tape cartridges, an elastic driving belt extends along a belt path around corner guide rollers positioned adjacent the tape reels, contacts the tape on the reels, and drives the tape from reel to reel. A tape path extends between the reels and along one edge of the cartridge across a cutaway portion providing access to the tape by a transducer such as a magnetic read/write head mechanism which is a part of a tape drive which receives the cartridge. The tape path is defined by a guide pin, a pair of tape guides, and in some cartridges, a pair of tape wrap pins, as originally disclosed in U.S. Pat. No. 4,221,348 to Moeller. One tape wrap pin is positioned between each reel and the adjacent tape guide to deflect the tape from a straight line path between the tape supply on the reel and the tape guide. This increases the frictional coupling between the tape and the tape wrap pin as the amount of tape wound on the reel increases and helps to maintain constant tape tension at the magnetic head.

In office environments, the noise levels that can be produced by tape cartridge operation are a serious problem. In addition to the aesthetic desirability of reducing noise, belt driven tape cartridges must meet ANSI and ISO noise standards.

Belt driven tape cartridges must meet minimum tape tension specifications while simultaneously maintaining maximum drive force specifications. The tape tension must not fall below a certain level as the tape passes from reel to reel or contact between the read/write head and the tape will be insufficient. The minimum achievable tape tension should be as high as possible to improve cartridge operation. Similarly, the maximum required drive force, the force applied to the cartridge drive roller, should be as low as possible to enhance cartridge operation within the power limitations of the drive motor which prevent the drive force from exceeding a particular level. These parameters are dependent on friction within the cartridge, therefore all friction sources must be controlled. Unlike other interfaces within the cartridge, such as the tape/tape guide interface, the interface between the drive roller and its pivot pin, and the interface between the reel and its pivot pin, where friction is to be minimized, corner guide roller friction is required to generate tape tension. Unless this friction is maintained within specific ranges, the tape cartridge will not perform properly.

Data tape cartridge rotating components can operate within various lubrication schemes in the interface between the guide roller and the pivot pin. At one extreme is a full film lubrication design, in which a relatively thick layer of lubricant resides between the guide roller and its pivot pin. The friction depends on the viscous properties of the lubricant which can push out of the interface between the guide roller and the pivot pin. A dry scheme involves no lubricant between the guide roller and its pivot pin. Between these two extremes are the boundary lubrication and the mixed lubrication designs. In mixed lubrication, regions of contact between the roller and its pivot pin are interspersed with regions of a relatively thick layer of lubricant. In a boundary lubrication scheme, a uniformly thin, "carpet" layer of lubricant resides between the roller and its guide pin. This permits smooth contact between the roller and pin that is governed by the respective surface characteristics of the parts. The guide roller-pivot pin interfaces in known cartridges typically operate in the mixed lubrication regime. Therefore, the surface texture, clearance, and lubricant significantly affect friction generation. Also, a smooth interface with regular asperities reduces vibrations which reduces operating noise levels.

One method for generating tape tension is to apply drag to the driving belt. Early attempts at directly contacting the driving belt with some form of brake to apply sliding friction, such as disclosed in U.S. Pat. No. 3,620,473, were found to unduly wear the belt and create debris within the cartridge. The difficulty in obtaining sufficiently controllable friction between a corner guide roller and its roller pivot pin while maintaining smooth rolling of the roller is documented in U.S. Pat. No. 4,102,516. The apparatus of this patent addresses this problem by using a biased washer to contact the guide roller hub and apply drag to the roller. However, this requires adding extra components to the tape cartridge, thereby increasing the cartridge complexity and presenting manufacturing difficulties. Additionally, the biasing characteristics of the washer can vary unacceptably over time, and drop tests have shown that this cartridge is not durable.

U.S. Pat. No. 4,474,342, discloses a belt driven tape cartridge in which one of the belt guide rollers is supported by a spring which biases the guide roller in a direction to lengthen the driving belt path to apply tension to the driving belt. However, this cartridge has a relatively complex driving belt path. Moreover, the spring introduces an additional subassembly into the tape cartridge and the biasing characteristics of the spring can vary unacceptably over time.

One current method for applying drag to the driving belt is to texture the bore of the guide roller to create friction between the guide roller and its pivot pin. The texture is created by sand or glass bead blasting (hereinafter sandblasting) a molding core pin and then molding the guide roller around the core pin. In this sandblasting technique, grains of abrasive particles such as silicon carbide or aluminum oxide are ejected from a nozzle and impinge on the surface of the molding core pin at a predetermined angle. The characteristics of the resulting texture are a function of the size, shape, and composition of the abrasive particles, the angle at which the particles strike the core pin surface, and the average velocity of the particles when they strike the core pin surface. The average velocity is directly determined by the nozzle pressure. Because the particles are harder than the surface being treated, the treated core pin surface is made up of many small and irregularly shaped pockets or pits. The resulting texture includes numerous random, uncontrolled, unrepeatable impressions caused by the impact of the individual abrasive particles. Also, as the guide roller is ejected from its molding core pin during manufacture, drag patterns are produced which alter the surface finish. Although this method can produce a desirable level of guide roller friction, the core pins and the resulting guide rollers formed using this process are irregular and the patterns formed thereon are not repeatable from roller to roller. Moreover, the degree of asperity contact, which controls friction, is difficult to quantify. As a result, cartridges using rollers formed by this method have a high variability in tape tensioning in their operation.

Omachi, Japanese Kokai No. 63-114471 discloses guide rollers with oil retaining grooves on the inner wall. The oil retaining grooves prevent lubricating oil from flowing in the direction of guide roller rotation and can reduce friction but are not disclosed as controlling the amount of friction or defining a range of friction between the guide roller and its pivot pin. Thus, the grooves do not necessarily enable the roller to yield constant repeatable results pass-to-pass within a cartridge or from cartridge-to-cartridge. They do not enable the roller to yield constant repeatable results pass-to-pass within a cartridge and from cartridge-to-cartridge.

None of these existing tape cartridges includes a simple yet consistent way to control drag on the driving belt to reduce the variability in the mechanical operation of the cartridge. None of the known guide rollers has a controlled surface texture which can control and define a desirable range of friction between the guide roller and its pivot pin. None of the references discloses repeatable roller operation and operating in a boundary lubrication scheme. None of the references teaches using a predetermined amount of friction which yields constant repeatable results pass-to-pass within a cartridge and from cartridge-to-cartridge. Nor does any reference disclose a corner guide roller which, in addition to controlling friction, controls and limits cartridge vibrations and acoustic noise.

There is a need for a belt driven tape cartridge in which the drag is less dependent on the tape speed than in existing cartridges to achieve higher minimum tape tension at low tape speeds as well as lower maximum drive force at high tape speeds. There is also a need for a tape cartridge in which there is low vibration at the guide roller-pivot pin interface to produce low noise levels during operation. There is also a need for a method of manufacturing guide rollers in which the characteristics of the rollers are highly repeatable and remain consistent from roller to roller.

SUMMARY OF THE INVENTION

A belt-driven, reel-to-reel magnetic tape data cartridge according to the present invention includes corner guide rollers which control drag as they guide the driving belt to tension the magnetic tape and reduce the variability of tape tensioning during the mechanical operation of the cartridge. Performance is improved because the guide roller drag is less dependent on the tape speed. This helps achieve higher minimum tape tensions at low tape speeds and lower maximum drive forces at high tape speeds. Each guide roller is a substantially cylindrical element having two end surfaces, an outer cylindrical surface, and an inner cylindrical surface. The inner cylindrical surface forms a central axial bore in the guide roller through which the guide roller is mounted on its pivot pin.

The inner cylindrical surface is textured to provide the guide roller with a controlled, predetermined degree and range of friction with its pivot pin. This provides a predetermined amount of drag to the driving belt to decrease the variability of the tape tensioning during operation and improve the performance of the tape cartridge. This enables the guide roller to operate on a thin film of lubricant in a boundary layer scheme where the friction level is not solely a function of the lubricant. Thus, the guide roller exhibits low friction variability over time, guide rollers made from different core pins exhibit low variability from roller to roller, and the pattern on the guide roller is repeatable.

The friction can be controlled by varying the number of asperity contact points on the inner surface. As the number of points is increased, the friction increases. While it is known to reduce friction to reduce drag, the present invention provides a controlled amount of friction to provide a predetermined amount of drag to the driving belt to decrease tape tensioning variability. The textured guide roller also enables the guide roller to reduce vibrations and noise in the cartridge. Accordingly, a controlled texture is applied to the inner cylindrical surface of the guide roller. Longitudinal splines are formed on the inner cylindrical surface of the guide roller by molding or machining. When molding this guide roller, the spline configuration is formed on the molding core pin.

DETAILED DESCRIPTION OF PREFERRED EMBODIMENTS

Figure 1:
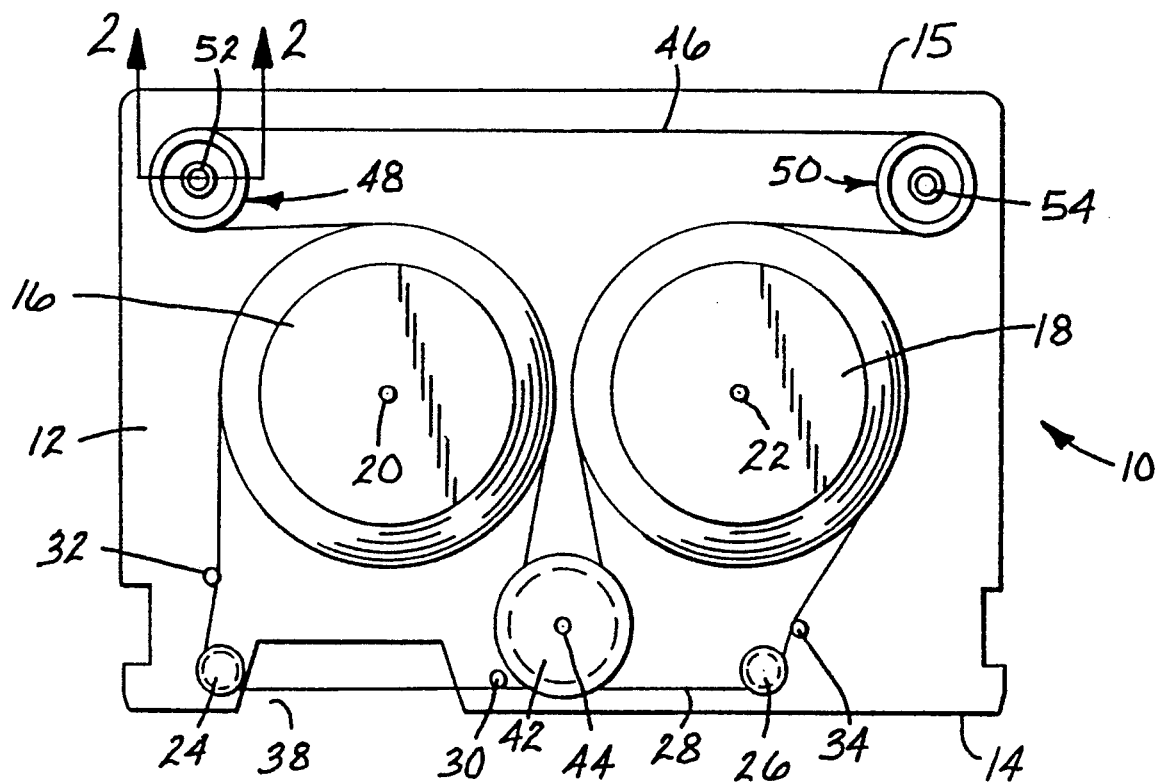
FIG. 1 is a top view of a belt driven data tape cartridge incorporating guide rollers according to the present invention.

The drawings illustrate a cartridge used in a recording and/or reproducing machine, hereinafter referred to as a tape drive (not shown). The tape drive typically includes a support frame including a horizontal cartridge support deck which supports a magnetic transducer or recording head and in a depending manner supports a reversible drive motor. The shaft of the drive motor extends through and carries a drive roller above the support deck. Elongate guides position a cartridge on the support deck. FIG. 1 illustrates a top view of a tape cartridge having corner guide rollers according to the present invention. The cartridge 10 is a thin generally rectangular enclosure formed by a base plate 12 and a cover (not shown).

Within the cartridge 10, two tape reels 16, 18 are mounted for free rotation on respective tape reel pins 20, 22 pressed into the base plate 12. Tape guides 24 and 26 are also formed on the base plate 12 and guide the magnetic tape 28 to and from respective tape reels 16, 18. A guide pin 30 is disposed on the base plate 12 intermediate the two tape guides 24, 26 and assists the tape guides 24, 26 in guiding the magnetic tape 28. Two tape wrap pins 32, 34 are mounted on the base plate 12 adjacent respective tape guides 24, 26. An opening (not shown) extends into a front edge wall 14 of the cartridge 10 centrally of the length of the edge wall to provide access for the drive roller of the tape drive. This edge wall is also formed with a cutaway portion 38 for access to the magnetic tape 28 by the magnetic recording head. A door (not shown) closes the cutaway portion 38 when the cartridge 10 is not in use.

The tape 28 is convolutely wound on the tape reels 16, 18 in opposite directions. A tape guide path between the reels 16, 18 is defined by the tape guides 24, 26, the tape guide pin 30, and the two tape wrap pins 32, 34. One tape guide 24 is positioned along the front edge wall of the cartridge 10 on one side of the cutaway portion 38, and the other tape guide 26, along with the guide pin 30, are positioned along the edge wall on the opposite side of the cutaway portion 38. One tape wrap pin 32 is positioned between the tape reel 16 and the adjacent tape guide 24, and the other tape wrap pin 34 is positioned between the tape reel 18 and its adjacent tape guide 26.

The magnetic tape 28 is driven from reel to reel via a drive system including a drive roller 42 which is mounted for free rotation on a drive roller pin 44. The drive roller 42 drives a driving belt 46 which winds around corner guide rollers 48, 50 and tape reels 16, 18. The guide rollers 48, 50 guide the driving belt 46 and are rotatably mounted on guide roller pivot pins 52, 54 mounted on the base plate 12. The pivot pins 52, 54 typically are formed of polished, hardened steel.

The driving belt 46 is thin, continuous, flexible, and elastic. It extends along the belt path around the drive roller 42 and the corner guide rollers 48, 50 and contacts the tape 28 on the tape reels 16, 18. The unstretched length of the driving belt 46 is less than the length of the belt path. Thus, when the belt 46 is stretched around the guide path it generates a belt tension which provides a frictional engagement force or side load between the guide rollers 48, 50 and their respective pivot pins 52, 54 as well as between the belt 46 and the tape reels 16, 18. The frictional engagement force presses the tape layers together to prevent the adjacent tape layers wound on the tape reels 16, 18 from slipping and spilling of the tape 28 from the supply reel. Since the frictional engagement force is dependent on belt tension, the tape tension and drive force are dependent on the belt tension.

The belt guide rollers 48, 50 are positioned at opposite corners of the cartridge base plate 12 along a back edge wall 15 parallel to the front edge wall having the cutaway portion 38. The guide rollers 48, 50 are constructed to have a predetermined non-zero coefficient of friction to provide a predetermined frictional coupling between each guide roller 48, 50 and its pivot pin 52, 54. This frictional coupling applies a predetermined frictional drag to the driving belt 46 as it passes around the guide rollers 48, 50 to increase the tension of the belt 46 and provide the proper tension drop between the tape reels 16, 18. The friction at each guide roller 48, 50, and therefore the belt tension differential, is a function of: (1) the plastic material properties, surface texture, and other properties of the guide roller 48, 50; (2) the lubricant's viscosity and other properties; (3) the surface characteristics of the guide roller pivot pins 52, 54; and (4) the clearance between the guide roller axial bore 66 and its pivot pins 52, 54. Thus, controlling friction is accomplished by manipulating one or more of these variables.

It is preferred to operate data tape cartridges 10 within the boundary lubrication region in the interface between each guide roller 48, 50 and its roller pivot pin 52, 54. A uniformly thin layer of lubricant resides between the roller and its guide pin. This permits smooth contact between the roller and pin that is governed by the surface characteristics of the parts and minimizes viscous full-film effects. Within this boundary lubrication layer design, it is desirable to control the friction at the guide rollers 48, 50 without altering the lubrication characteristics. Sufficient asperity contact between the guide roller 48, 50 and its respective pivot pin 52, 54 is required to maintain operation of the guide roller-pivot pin interface in this boundary region rather than having the interface operate in a full film region. Thus, the number and/or shape of the contacts between the guide roller 48, 50 and its pivot pin 52, 54 must be controlled. This also lessens the likelihood of lift-off occurring between the guide roller 48, 50 and its pivot pin 52, 54.

Figure 2:
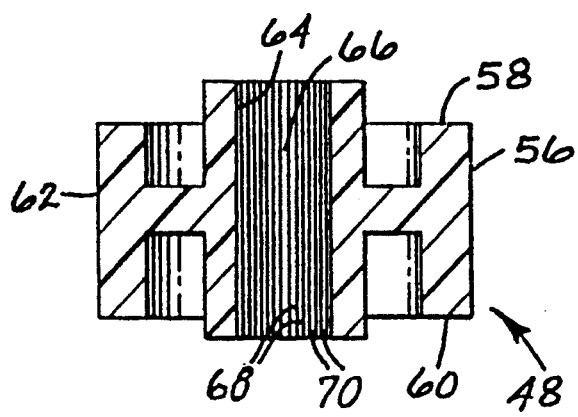
FIG. 2 is a cross-sectional view of a guide roller according to the present invention.

FIG. 2 illustrates details of the corner guide rollers referring to guide roller 48 for simplicity. Each guide roller 48 is a substantially cylindrical element 56 having top and bottom end surfaces 58, 60 and an outer cylindrical surface 62. The number and/or shape of the contact points between each guide roller 48 and its pivot pin 52 are modified by providing a structured, textured inner cylindrical surface 64 to the surface texture of the central axial bore 66 of the guide roller 48. The pivot pin 52 passes through the central axial bore 66 to mount the guide roller 48 in the cartridge 10.

The structured, textured inner cylindrical surface 64 includes projections, such as axial or longitudinal splines 68, which are separated by grooves 70. The splines 68 add a known, oriented texture to the inner cylindrical surface 64. It has been found that thirty-two full length splines 68 each having a width and depth of 0.013 mm (0.005 in) and being rounded with a 0.025 mm (0.001 in) radius provide superior variability performance than known guide roller designs.

Figure 3:
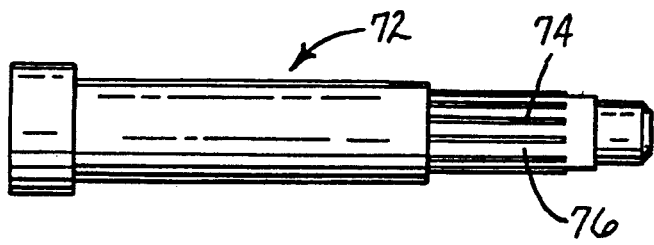
FIG. 3 is a side view of a molding core pin having a splined textured surface according to the present invention.

The splines 68 are formed on the inner cylindrical surface 64, preferably by molding, although machining can also be used. The inner cylindrical surface 64 of the guide roller 48 shown in FIG. 2 has a controlled texture formed on the guide roller 48 by first forming, by any known precision method such as electrical discharge or diamond turning machining, the texture on a molding core pin 72, shown in FIG. 3, and then molding each guide roller 48 around the core pin 72. During molding, the splines 74 on the molding core pin 72 become the grooves 70 on the guide roller 48, and the grooves 76 on the molding core pin 72 become the splines 68 on the guide roller 48.

Plastic such as polyacetel or similar polymers is injected in a mold cavity around the molding core pin 72. The splines 68 are oriented in the direction of removal from the molding core pin 72 to reduce the amount of pattern disruption and the formation of "drag patterns" which are imparted to the inner cylindrical surface 64 of the guide roller 48 when the guide roller 48 is removed from the molding core pin 72. This significantly reduces molding core pin wear which can impart an inconsistent finish to the guide roller.

As it is relatively easy to measure and precisely form and orient the splines 68, a controlled, predetermined guide roller-pivot pin friction coupling is attained. This insures boundary lubrication and controls asperity contact between the guide roller 48 and the roller pivot pin 52. This generates the appropriate level of tape tension and thereby permits the use of higher minimum tape tensions at low tape speeds and results in lower maximum drive forces at high tape speeds, both of which increase the cartridge effectiveness as described below. The friction level is controllably dependent on the number of contact points between the guide roller 48 and the pivot pin 52.

The resulting texture on the molding core pin 72 is more rounded and has a larger peak to valley height than that formed by sandblasting. The texture is smooth and uniform. In contradistinction, in sandblasting, each sandblasting particle is unique and the formed texture depends on at least the size, shape, and composition of the particles, their velocity, and the angle of impact of the particles on the molding core pin. These are not easily controllable characteristics and the size and shape of the particles are altered with each use.

Additionally, the molding core pin 72 has circumferential uniformity in that the texture on each molding core pin is uniform all the way around. Therefore, the guide rollers 48 formed using these molding core pins operate better than rollers textured by sandblasting and yield a low variability in the drag produced on the driving belt 46 during operation and repeatable performance with respect to individual tape passes within a cartridge as well as from cartridge to cartridge. Thus, the load at the guide roller/roller pin interface is better distributed to reduce stress concentrations and reduce local wear. This wear reduction means the conditions at the guide roller/roller pin interface remains constant and permit the cartridge 10 to operate with greater consistency and reduced tape tensioning variability.

In terms of cartridge variables that are commonly measured, the "effectiveness" of a data tape cartridge is its ability to create tape tension with a minimum of drive force. The effectiveness is defined as:

$$EFF = TTmin/(DFmax - TTmin)$$

where DFmax is the maximum drive force and TTmin is the minimum tape tension. Thus, the effectiveness increases both when the minimum tape tension is high and when the difference between the maximum drive force and the minimum tape tension is low. Tests measured the effectiveness of the textured rollers of the present invention in tape cartridges as compared with cartridges using known guide rollers. The known rollers yielded an average cartridge effectiveness of 0.47. Cartridges 10 using structured rollers 48 with 10 splines had an average effectiveness of 0.61. When rollers 48 with 32 splines were used, an average efficiency of 0.70 resulted, an almost 50% increase over known rollers. Thus, the textured inner cylindrical surface 64 increases the minimum tape tension without unduly increasing the maximum drive force to increase the cartridge effectiveness.

Figure 4B:
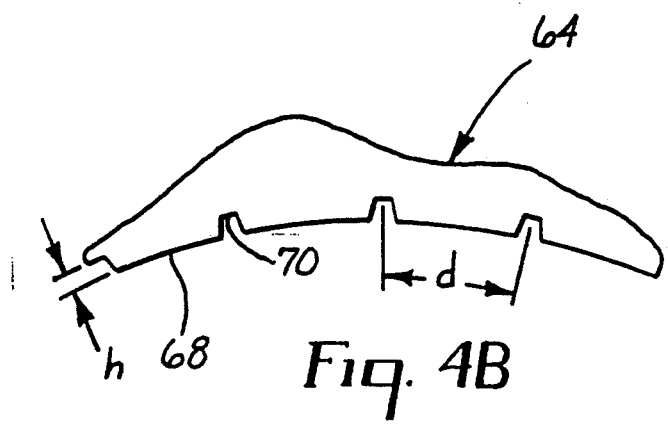
FIGS. 4A and 4B are schematic illustrations of a guide roller inner surface having 32 splines.
Figure 4A:
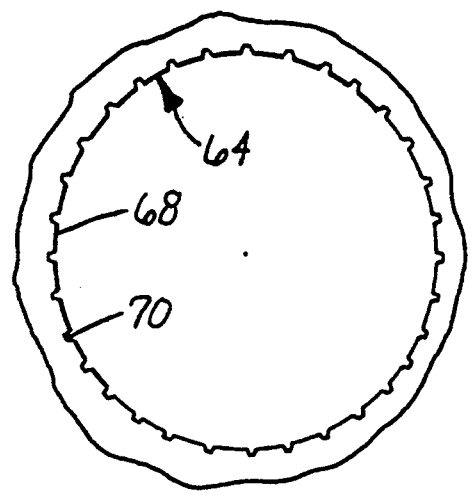
Figure 5:
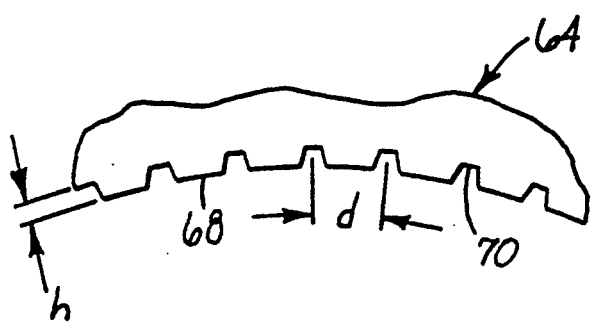
FIG. 5 is a schematic illustration of a guide roller inner surface having 64 splines.
Figure 6:
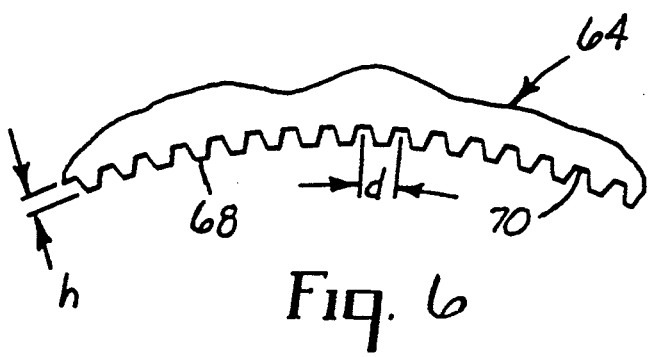
FIG. 6 is a schematic illustration of a guide roller inner surface having 128 splines.
Figure 9:
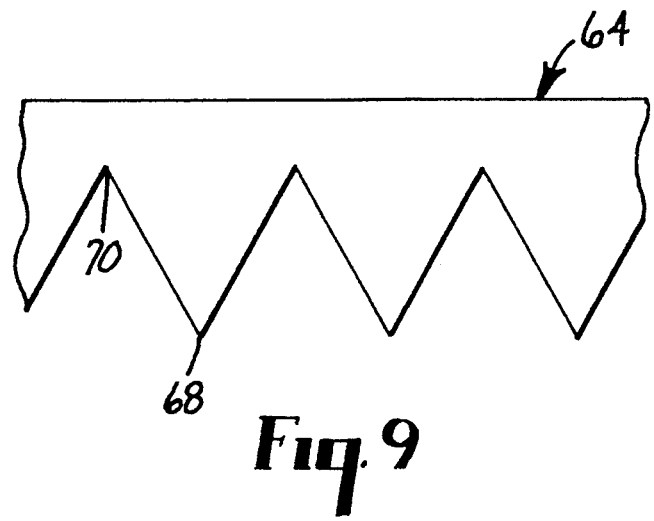
FIG. 9 is a schematic illustration of a guide roller inner surface having 355 splines.
Figure 10:
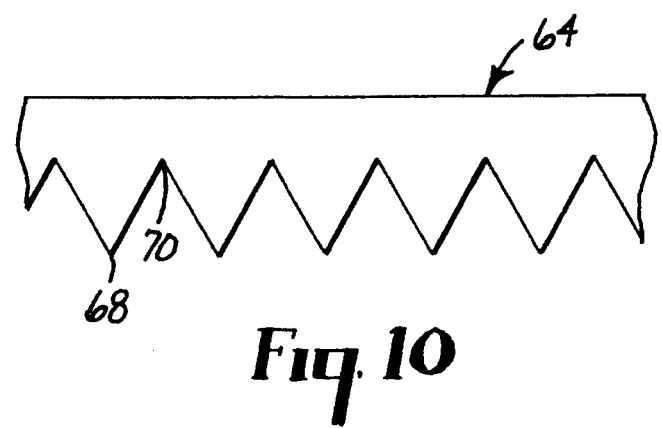
FIG. 10 is a schematic illustration of a guide roller inner surface having 705 splines.
Figure 11:
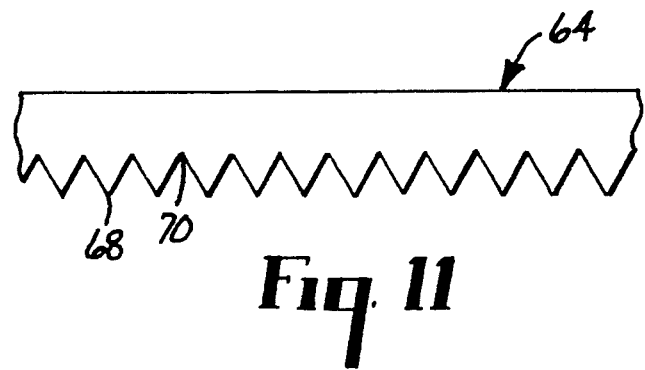
FIG. 11 is a schematic illustration of a guide roller inner surface having 1404 splines.

FIGS. 4, 5, and 6 show schematic diagrams of the inner surface 64 of a guide roller 48 according to the present invention. In FIGS. 4A and 4B a thirty-two splined inner surface 64 is shown, the center to center angular displacement d between adjacent splines 68 being 11.25°. In FIG. 5 a sixty-four splined inner surface 64 is shown, and in FIG. 6 a one hundred twenty-eight splined inner surface is shown. In FIG. 5 the center to center angular displacement d between adjacent splines 68 is 5.625° and in FIG. 6 the angular displacement d is 2.8125°. All of these versions include spline heights h of 0.05 mm (0.002 inches). Also, guide rollers 48 having 355, 705, and 1404 splines have been tested and yield excellent results as described below. These rollers are illustrated in FIGS. 9, 10, and 11.

Tape cartridges 10 having different sizes and different operating parameters require different levels of drag on the driving belt 46. For example, some large (5¼ inch form factor, quarter inch tape) data cartridge guide rollers when operating at tape linear speeds of 2.286 m/s (90 in/s) and with 8.896N (32 oz) side loads generate a guide roller drag of approximately 0.278N (1 oz). The thirty-two splined corner guide roller 48 generates a mean drag of 0.127N (0.457 ounces). This does not produce sufficient drag for the cartridge. Thus, it is necessary to increase the friction generated by the guide roller 48. This is accomplished by increasing the amount of contact between the guide roller 48 and its pivot pin 52 which can be achieved by increasing the number of splines 68. The spline height also affects the area and type of contact between the guide roller 48 and its pivot pin 52. Where the height is low and the inner surface of the guide roller 48 is too smooth, the roller 48 lifts onto a full film lubrication layer. Where the height is too great, no such lift is obtained. It is believed that a peak to valley height of the splines 68 between 0.002 and 0.13 mm (0.000075 and 0.005 inches) provides operation between these extremes. Since different types of cartridges 10 require different frictional drag amounts, guide rollers having different numbers of splines and spline heights are used for different tape cartridges.

Figure 7A:
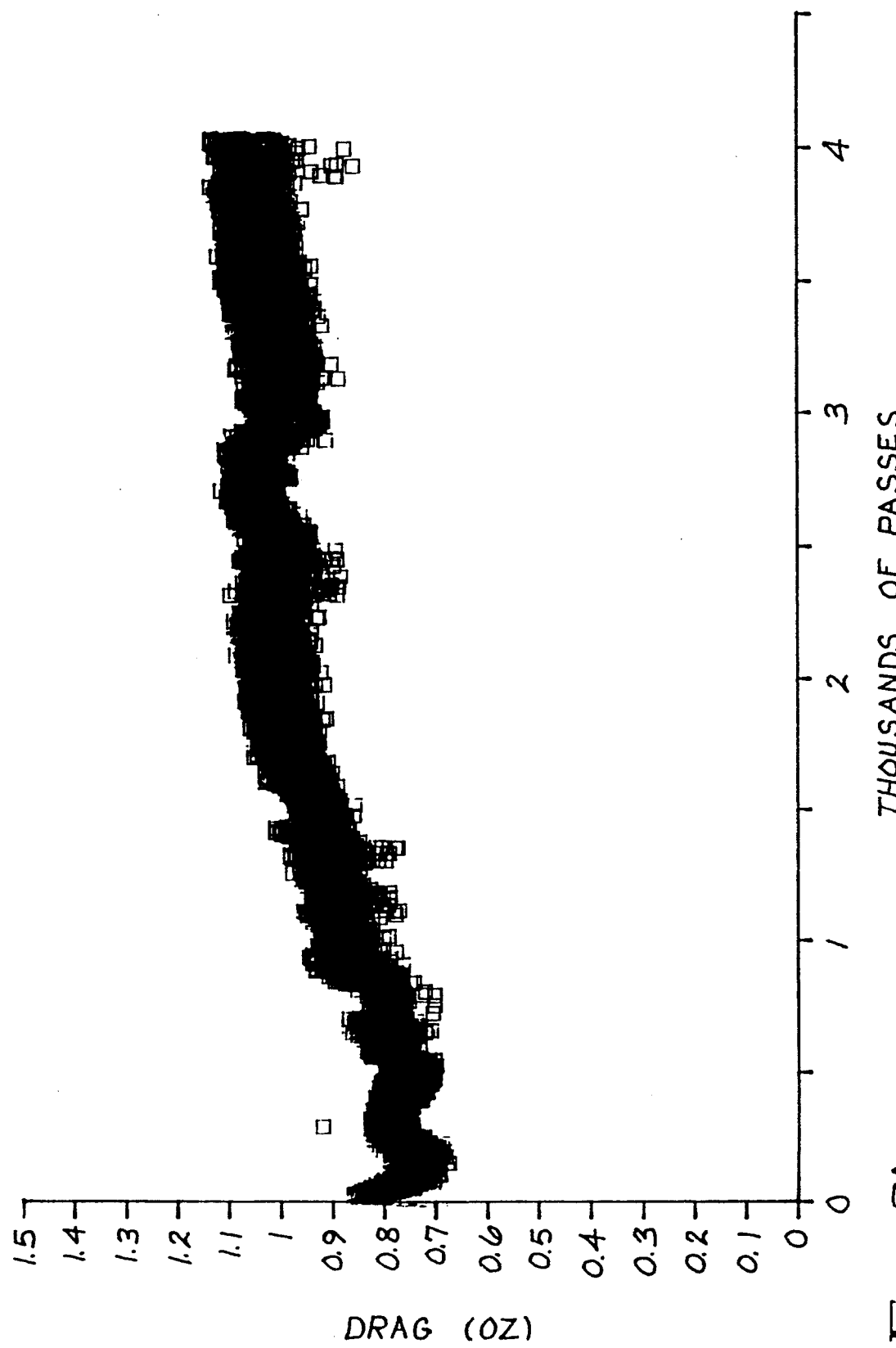
FIGS. 7A and 7B are graphs comparing the drag characteristics of guide rollers according to the present invention with known guide rollers.
Figure 7B:
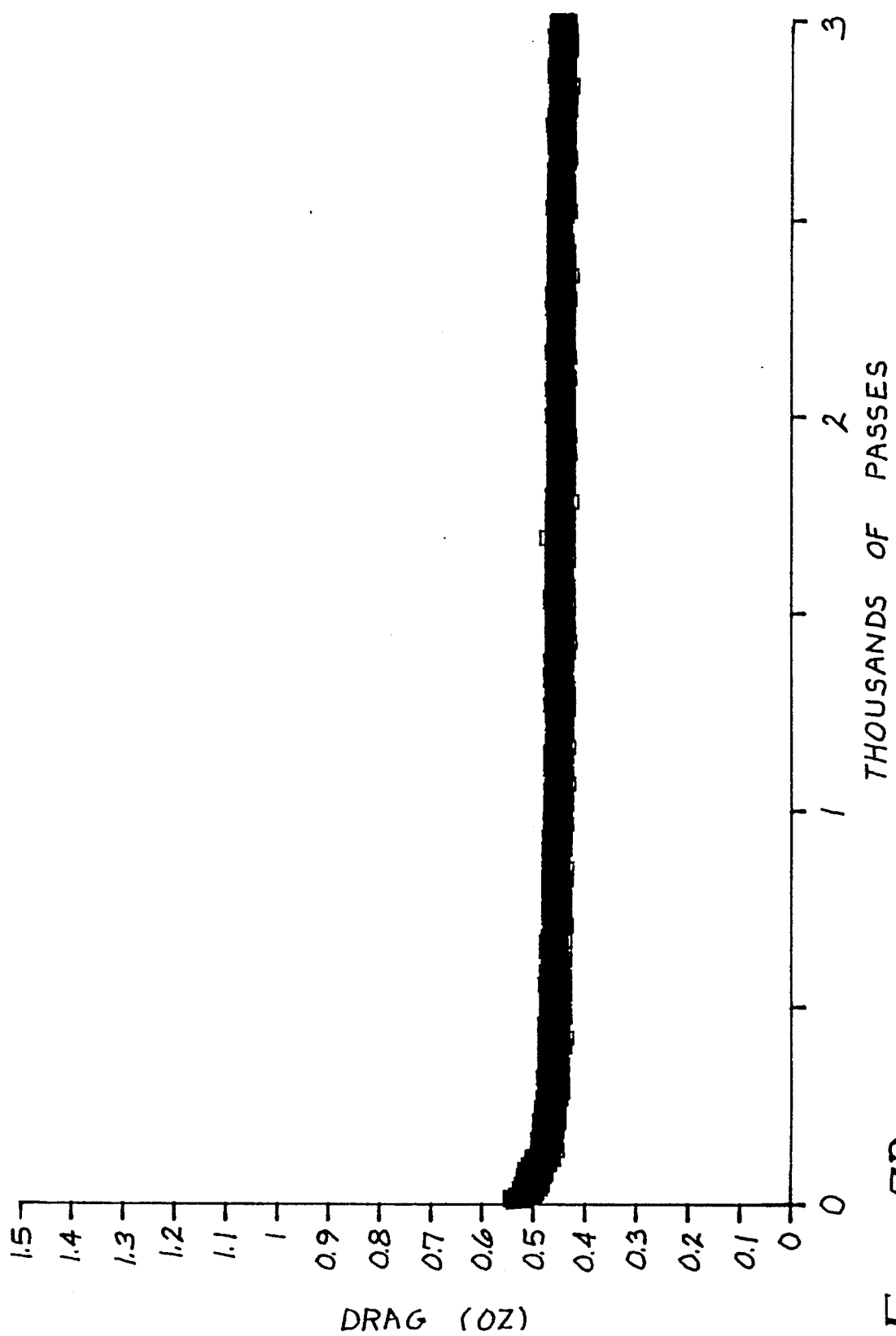

FIG. 7 graphically compares the frictional performance of a known guide roller using a random texture formed by sandblasting (FIG. 7A) and of a thirty-two splined guide roller 48 (FIG. 7B), as illustrated by the drag generated by the guide rollers in a pass of the tape streaming from one reel to the other reel. The friction between the guide roller 48 and the pivot pin yields a pass to pass drag range of less than 0.0556N (0.2 oz) and close to 0.0278N (0.1 oz). The known rollers have a range of friction of greater than 0.1112N (0.4 oz). Additionally, the varying frictional performance of each roller from its nominal level is represented mathematically by the standard deviation of the drag force measurements over time. The standard deviation of the drag measurements for the known design is 0.109 oz. In contrast, the splined roller 48 has a significantly lower standard deviation of 0.015 oz. This illustrates the much lower variability of roller performance when the guide rollers 48 of the present invention are used.

Figure 8A:
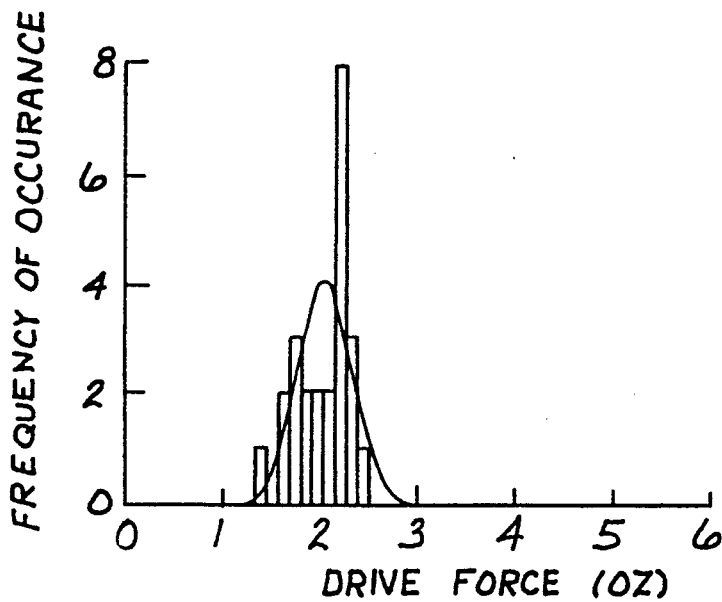
FIGS. 8A, 8B, and 8C are graphs comparing the sample distribution of the drive force of data tape cartridges assembled with guide rollers according to two embodiments of the present invention with a data cartridge using known guide rollers.
Figure 8B:
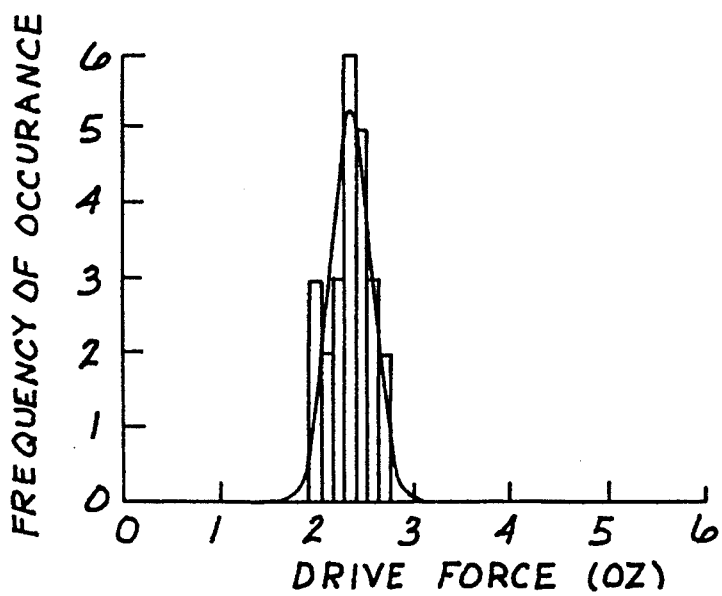
Figure 8C:
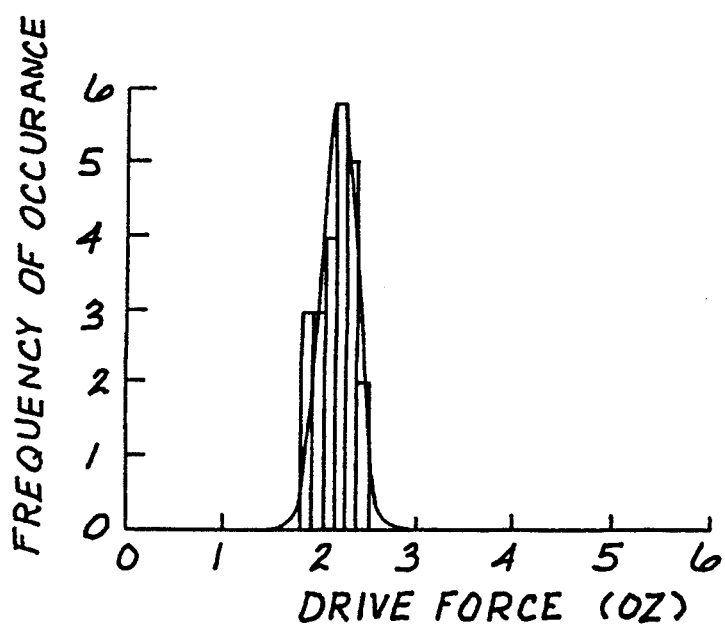

FIGS. 8A, 8B, and 8C graphically compare the operating variability of cartridges 10 assembled with the various textured rollers 48 (FIG. 8B shows the results for a cartridge assembled with a guide roller 48 with 10 splines, and FIG. 8C shows the results for a cartridge assembled with a guide roller 48 with 32 splines) with the variability of a cartridge using a random textured roller (FIG. 8A). The graphs show the number of occurrences of a given total drive force required to drive the cartridge at a tape speed of 2,286 m/s (90 in/s). The normal distribution curves superimposed on the bar graphs reinforce the distribution differences in the operation of the different roller designs. As the graphs illustrate, the splined rollers 48 have a much tighter distribution of drive forces implying a reduced variability. The friction between the guide roller 48 and the pivot pin yields a pass to pass cartridge drive force varying within a range of 0.278N (1 oz). Known guide rollers can not attain such a low variance of the pass to pass drive force. The known rollers have a drive force variance of greater than 0.278N (1 oz) as shown in FIG. 8A.

As indicated in FIG. 7 by the very low standard deviations for corner guide roller drag and in FIG. 8 by the tight force distribution measured for cartridges 10 with the guide rollers 48 of the present invention, the controlled splined textured rollers 48 generate a very stable level of friction over several thousand cartridge passes. This generates a stable drive force and illustrates the very low friction variability over time. Additionally, the patterns formed on the guide rollers 48 have a high degree of repeatability. The patterns can be formed on many core molding pins 72 to create numerous guide rollers 48 having virtually identical low variability drag characteristics.

Figure 12:
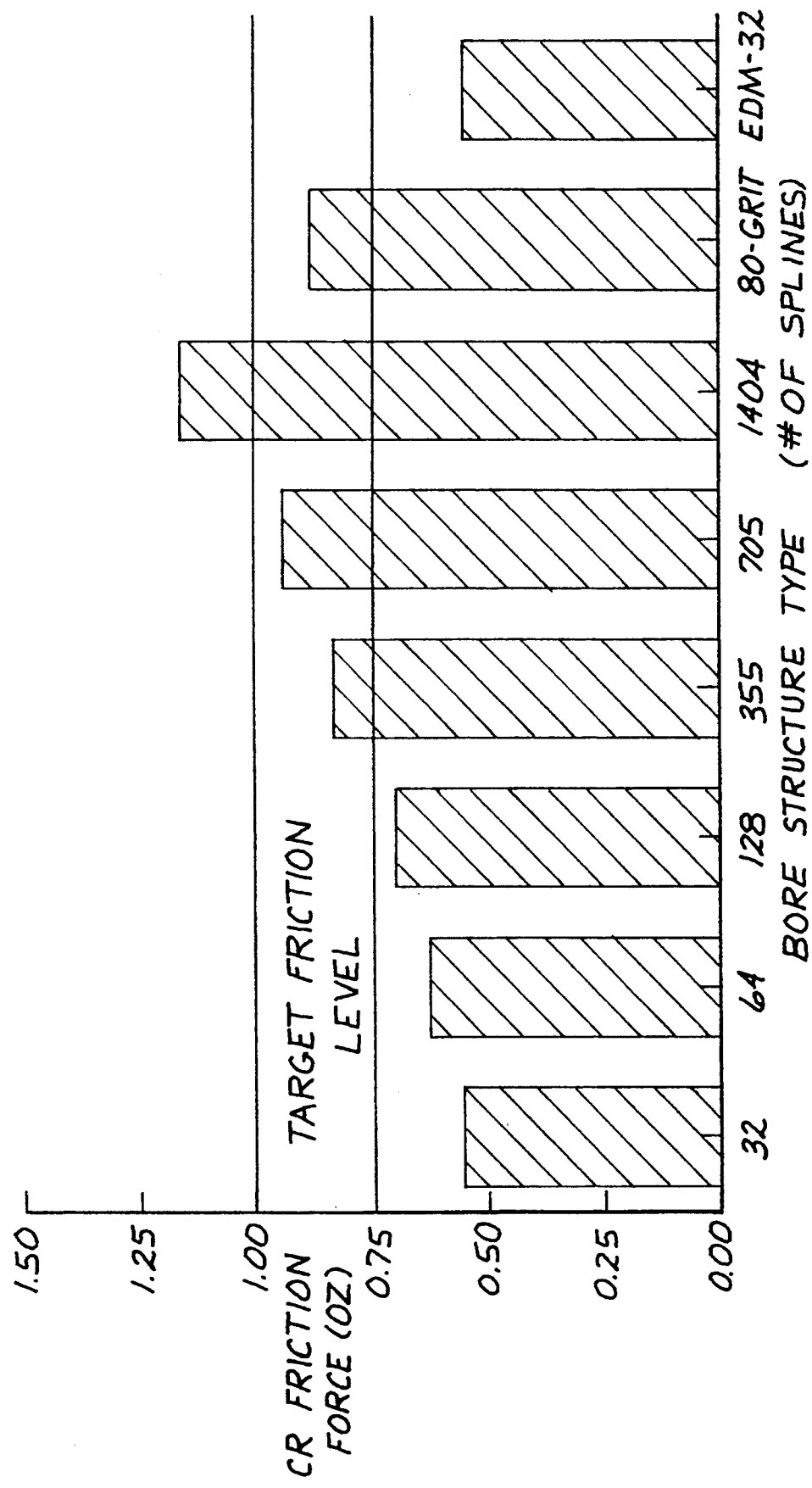
FIG. 12 charts the friction force levels as a function of the number of splines on the guide roller.

However, as shown in FIG. 7, while the 32-splined roller achieves very low variability, even this guide roller does not achieve the desired level of friction. The chart of FIG. 12, illustrates the guide roller friction as a function of the number of splines. The data represents the average of five samples. As shown, the friction increases with the number of splines. The friction ranges from about 0.139N (0.5 oz) to 0.334N (1.2 oz) which encompasses the required friction range of 0.208N (0.75 oz) to 0.278N (1.00 oz). The configurations using 355 and 705 splines meet the friction range requirements. Thus, using from 355 to 705 splines (and probably from approximately 280 to 915 splines calculated by linearly extrapolating from the graph) not only achieves low variability operation, but also produces friction within the required range.

Comparing the spline geometry of the 32, 64, and 128 spline guide rollers of FIGS. 4, 5, and 6, respectively with that of the 355, 705, and 1404 spline guide rollers of FIGS. 9, 10, and 11, respectively, shows that various spline bore profiles were used. It is not believed that the differing geometries significantly affected the results discussed above, that friction increases with the number of splines. This is because point contact occurs at each spline independent of the actual spline geometry; it is the discrete contact points created by the number of splines that directly relate to and produce the relationship between the number of splines and the friction levels generated at the guide roller-pivot pin interface. This is borne out by the comparison of the 32-splined guide roller in FIG. 12. One set of guide rollers was prepared using diamond turning machining and having spline heights of 0.005 cm (0.002 in) and the other set was prepared using electrical discharge machining and having spline heights of 0.013 cm (0.005 in). The friction level was not effected, suggesting that the 0.005 cm (0.002 in) spline height is sufficient to negate full-film lubrication effects and that the method of manufacture is not critical for the friction level performance.

An additional desired, yet unexpected, result obtained by using a large number of splines 68 on the guide roller 48 is the reduction in vibrations and noise levels. High frequency vibration has been correlated to cartridge acoustic sound power, which is a measurement of the noise during cartridge operation. Noise levels generated by known corner guide roller vibration are generally audible, and it is desired to reduce these noise levels. Tests were conducted comparing variously splined rollers formed by molding on core pins prepared by diamond turning machining with rollers formed on core pins prepared as an 80 grit sandblasted surface and 32 splined rollers formed on core pins prepared with electrical discharge machining.

Figure 13:
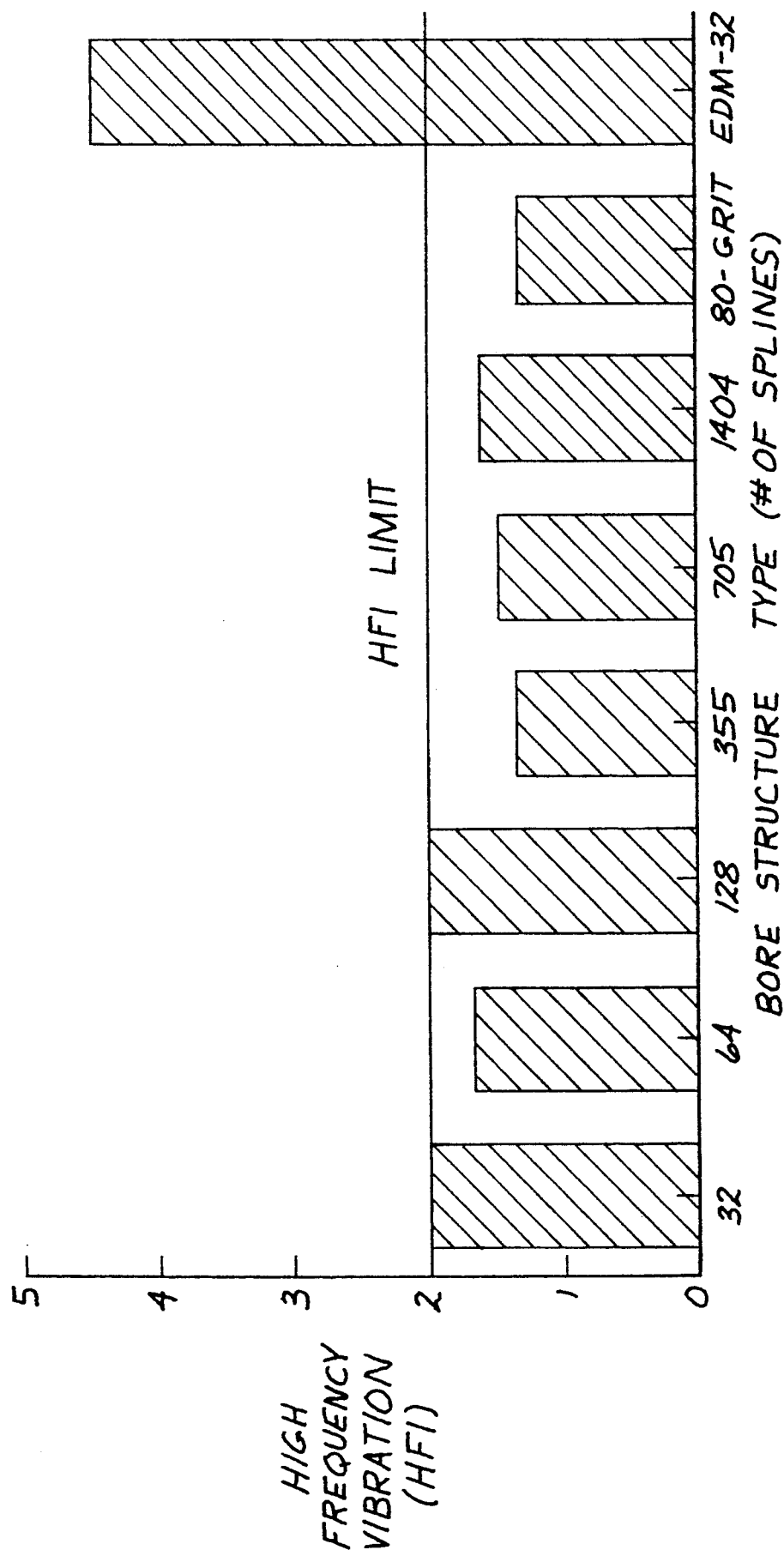
FIG. 13 charts the high frequency vibration levels as a function of the number of splines on the guide roller.

FIG. 13 charts the 500–5000 Hz vibration levels as a function of the number of splines on the guide roller. The 80-grit entry is for sandblasted guide rollers. The 355-splined guide roller exhibits the lowest vibrations. Only the 32-splined guide roller formed with electrical discharge machining exceeds the proposed vibration limit of 2 on the high frequency index, a dimensionless unit. None of the other guide rollers exceeds the limit, although the guide rollers with 32 and 128 splines reach the limit.

Figure 14:
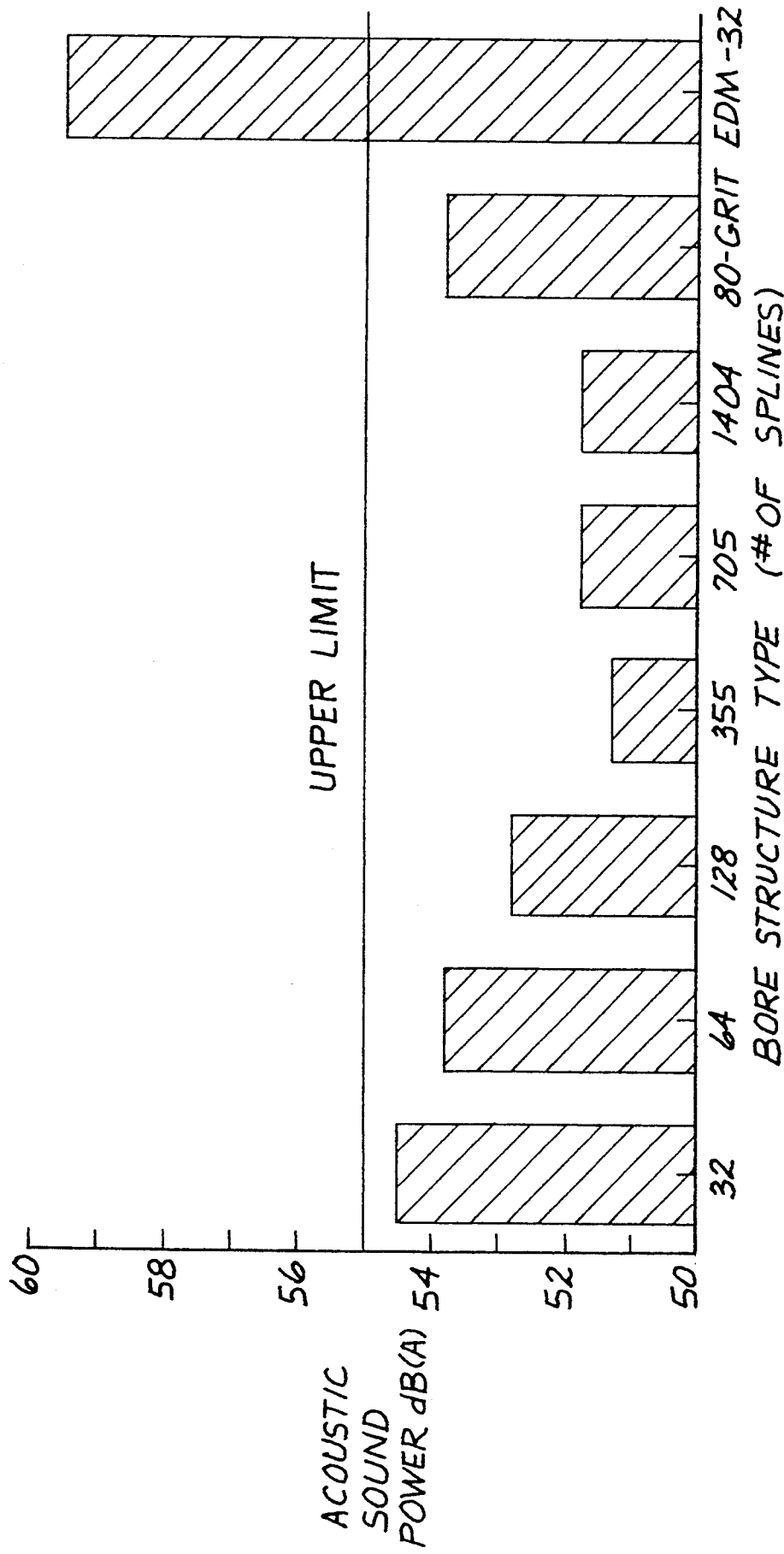
FIG. 14 charts the acoustic sound power as a function of the number of splines on the guide roller.

FIG. 14 charts the acoustic sound power, measured on the dB(A) scale, as a function of the number of splines on the guide roller. As shown here, although all of the guide roller configurations are within the upper sound power limit of 55 dB(A), the guide roller with 355 splines is only half as loud as the guide roller with only 32 splines and over four times quieter than the 32-splined roller formed using electrical discharge machining which exceeds the upper limit.

Figure 15:
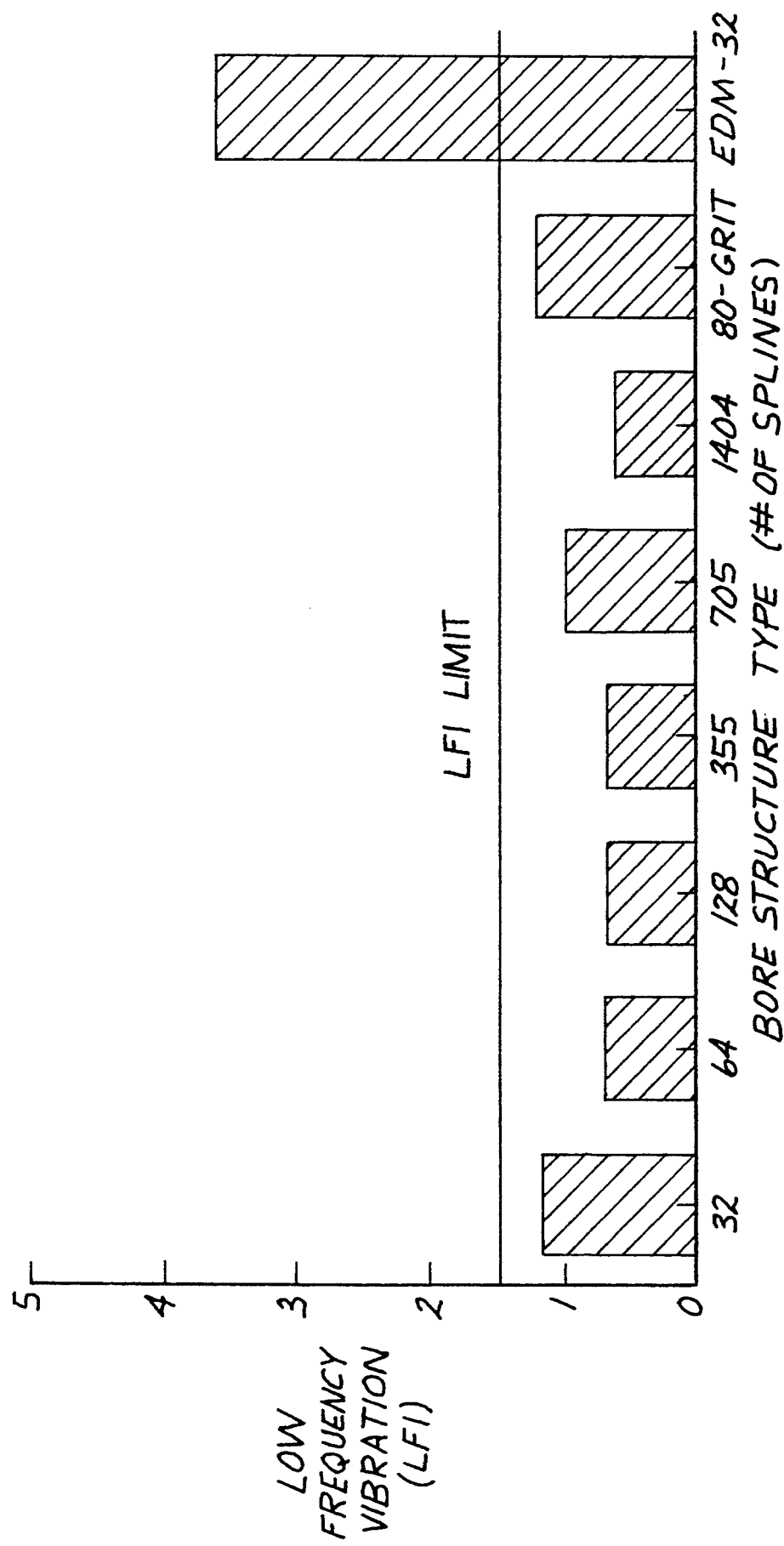
FIG. 15 charts the low frequency vibration levels as a function of the number of splines on the guide roller.

FIG. 15 charts the low frequency vibration levels as a function of the number of splines on the guide roller. The 1404-splined guide roller exhibits the lowest low frequency vibrations, with the guide rollers having 64, 128, and 355 splines not much higher. Only the 32-splined guide roller formed with electrical discharge machining exceeds the proposed low frequency vibration limit of 1.5 on the low frequency index, a dimensionless unit. None of the other guide rollers exceeds the limit.

FIGS. 13–15 show that the guide rollers with 355 and 705 splines performed the best from a standpoint of 500–5000 Hz (high) frequency vibration and acoustic performance. The spacing between the splines affects high frequency vibration and, therefore, at least in part, the acoustic performance. (The guide roller with 355 splines also was among the best for low frequency performance. Low frequency performance is not as critical a factor as the others with respect to noise although lower low frequency vibrations imply rounder and more concentric guide rollers.) Guide rollers with 128 splines or less had higher acoustic noise levels. The best of the splined configurations performed as well as or better than the guide roller formed with sandblasting. The acoustic noise deficiencies in the guide roller formed with electrical discharge machining are believed to result from the relatively imprecise surface formed using this method as compared to the surfaces formed with diamond turning machining. (The sandblasted version of the guide roller has better acoustic characteristics than the guide roller formed by electrical discharge machining because, although the sandblasting method is unrepeatable and uncontrollable, the texture characteristics do not differ from each other by as much as with electrical discharge machining.) This simply points out the desirability for precise tooling.

Moreover, the desired level of friction is achieved from roller to roller with less dependence on lubrication. By controlling friction via altering the inner surface characteristics of the guide rollers 48, small changes in the amount of lubrication or the lubricant viscosity in the guide roller-pivot pin interface do not affect the drag characteristics. The textured, structured guide rollers 48 of the present invention also are less dependent on the tape speed and are less sensitive to the clearance between the guide roller 48 and its support pin 52 which is difficult to control during molding.

Additionally, the grooves 70 of guide roller 48 serve as a reservoir for lubricant, thereby preventing lubricant starvation and maintaining the smooth rolling characteristics of the guide roller 48. The grooves 70 assure boundary lubrication and discourage full film lubrication between the guide roller 48 and its pivot pin 52. Moreover, these grooves 70 also can serve as locations in which any debris particles may be deposited to prevent the debris from accelerating the wear process and interfering with the normal rolling operation of the guide rollers 48.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For instance, although no rollers having more than 1404 splines were tested, it is anticipated that larger numbers of splines could be used.

We claim:

1. A guide roller for rotation around a cylindrical pivot pin comprising:
   a cylindrical inner surface for contacting and rotating around the pivot pin, the inner surface comprising means including a controlled surface texture for controlling friction between the guide roller and the pivot pin, wherein the textured inner surface comprises a plurality of axial splines formed on the inner surface, the axial splines being separated from each other by grooves, wherein the axial splines are triangular and are formed of two intersecting flat planar surfaces with the planar surfaces that form a given spline intersecting with the planar surfaces that form the adjacent splines, and wherein the splines contact the pivot pin along an axial line, represented in cross section by a contact point wherein the planar surfaces of the splines are not tangent to the surface of the pivot pin.

2. The guide roller of claim 1 wherein the splines extend for the entire axial length of the guide roller.

3. The guide roller of claim 1 wherein the peak to valley height of the splines ranges up through 0.13 mm.

4. The guide roller of claim 1 wherein the textured inner surface comprises at least 64 splines, and further comprising means for controlling the vibration between the guide roller and the pivot pin to decrease the acoustic sound power produced by the tape cartridge during operation, wherein the acoustic sound power produced by the tape cartridge during operation is less than 54 dB(A).

5. The guide roller of claim 4 wherein the textured inner surface comprises at most 915 splines.

6. The guide roller of claim 5 wherein the textured inner surface comprises 355 splines.

7. The guide roller of claim 5 wherein the textured inner surface comprises 705 splines.

8. The guide roller of claim 4 wherein the width of the spline is no greater than twice the width of the grooves.

9. The guide roller of claim 8 wherein the width of the splines is substantially equal to the width of the grooves.

10. The guide roller of claim 4 wherein each spline is formed of at least two non-coplanar surfaces.

11. The guide roller of claim 1 wherein the guide roller operates within the boundary lubrication region using a uniformly thin layer of lubricant in the interface between the guide roller and the roller pivot pin, wherein within this boundary lubrication region friction can be controlled by selecting the number of asperity contacts between the guide roller and the pivot pin to prevent the interface from operating in a full film region.

12. A belt driven reel-to-reel tape cartridge having a belt which is mounted around a drive roller and a pair of guide rollers each rotatably supported on a pivot pin, the belt contacting the tape reels to drive the taper reels, wherein each guide roller comprises a cylindrical outer surface for contacting and guiding the driving belt and a cylindrical inner surface for contacting and rotating around the pivot pin, the inner surface comprising means for controlling the drag on the driving belt to decrease the dependence of tape drag on the tap speed, to increase the minimum tape tension at low tape speeds, and to decrease the maximum drive force on the belt at high tape speeds, wherein the drag controlling means comprises a textured surface, and wherein the textured inner surface comprises at least 64 axial splines formed on the inner surface, the axial splines being separated from each other by grooves, wherein the axial splines are triangular and are formed of two intersecting flat planar surfaces with the planar surfaces that form a given spline intersecting with the planar surfaces that form the adjacent splines, and wherein the splines contact the pivot pin along an axial line, represented in cross section by a contact point wherein the planar surfaces of the splines are not tangent to the surface of the pivot pin.

13. The tape cartridge of claim 12 further comprising means for controlling the vibration between the guide roller and the pivot pin to decrease the acoustic sound power produced by the tape cartridge during operation, wherein the acoustic sound power produced by the tape cartridge during operation is less than 54 dB(A).

14. The tape cartridge of claim 13 wherein the vibration controlling means comprises the same textured surface as the drag controlling means.

* * * * *